US009670675B2

(12) United States Patent
Doyle

(10) Patent No.: US 9,670,675 B2
(45) Date of Patent: Jun. 6, 2017

(54) ALIGNMENT GUIDES FOR CONSTRUCTING BUILDING COMPONENTS

(71) Applicant: Brian Doyle, Greater Madawaska (CA)

(72) Inventor: Brian Doyle, Greater Madawaska (CA)

( * ) Notice: Subject to any disclaimer, the term of this patent is extended or adjusted under 35 U.S.C. 154(b) by 0 days.

(21) Appl. No.: 15/274,552

(22) Filed: Sep. 23, 2016

(65) Prior Publication Data

US 2017/0009453 A1     Jan. 12, 2017

Related U.S. Application Data

(62) Division of application No. 14/048,939, filed on Oct. 8, 2013, now Pat. No. 9,482,017.

(51) Int. Cl.
| | | |
|---|---|---|
| G01B 5/25 | (2006.01) | |
| E04C 2/34 | (2006.01) | |
| E04F 21/00 | (2006.01) | |
| E04C 2/24 | (2006.01) | |
| E04G 21/18 | (2006.01) | |
| E04B 2/00 | (2006.01) | |

(52) U.S. Cl.
CPC .............. *E04C 2/34* (2013.01); *E04C 2/246* (2013.01); *E04C 2/44* (2013.01); *E04F 21/003* (2013.01); *E04G 21/1841* (2013.01); *G01B 5/25* (2013.01); *E04C 2002/3488* (2013.01); *Y10T 29/49627* (2015.01)

(58) Field of Classification Search
CPC ..... E04F 21/003; E04F 21/00; E04F 21/1855; G01B 11/02; G01B 3/14; G01B 3/18; G01B 3/20; G01B 5/0025; G01B 5/043; G01B 5/14; G01B 5/242; G01B 5/25

USPC ........................................... 33/533, 613, 645
See application file for complete search history.

(56) References Cited

U.S. PATENT DOCUMENTS

| | | | |
|---|---|---|---|
| 2,911,022 | A | 11/1959 | Brown |
| 4,947,616 | A | 8/1990 | Sorton |
| 4,955,142 | A | 9/1990 | Rieck |
| 5,111,632 | A | 5/1992 | Turner |
| 5,280,692 | A | 1/1994 | Patey |
| 5,481,844 | A | 1/1996 | Kajita |
| 5,997,209 | A | 12/1999 | Sachs |
| 6,295,780 | B1 | 10/2001 | Thompson |
| 6,308,491 | B1 | 10/2001 | Porter |
| 6,463,711 | B1 | 10/2002 | Callies |
| 6,647,638 | B1 | 11/2003 | Doyal |
| 7,069,659 | B1 * | 7/2006 | Rye ...................... E04F 21/003 33/194 |
| 7,617,612 | B2 | 11/2009 | Brizendine |
| 7,971,410 | B2 | 7/2011 | Jerke |
| 8,544,229 | B2 * | 10/2013 | Kilgore ............. E04F 15/02044 52/177 |
| 8,615,958 | B2 * | 12/2013 | Kilgore ............. E04F 15/02044 52/650.3 |
| 9,206,594 | B1 | 12/2015 | Grevious et al. |

(Continued)

FOREIGN PATENT DOCUMENTS

DE           3400404 A1     7/1985

*Primary Examiner* — Yaritza Guadalupe-McCall
(74) *Attorney, Agent, or Firm* — The Webb Law Firm

(57) ABSTRACT

The invention pertains to the field of construction of buildings and structures. The invention relates to alignment guides for constructing building components, namely walls, ceilings and floors to be used in buildings and structures. This invention also relates to kits of specific alignment guides and methods of using alignment guides.

2 Claims, 14 Drawing Sheets

(56) References Cited

U.S. PATENT DOCUMENTS

| | | | |
|---|---|---|---|
| 9,482,017 B2* | 11/2016 | Doyle | .................. E04F 21/003 |
| 2004/0129845 A1 | 7/2004 | Whale et al. | |
| 2010/0083519 A1* | 4/2010 | Bradley | ............. E04G 21/1841 |
| | | | 33/613 |
| 2015/0096185 A1 | 4/2015 | Doyle | |

* cited by examiner

ALIGNMENT GUIDES FOR CONSTRUCTING BUILDING COMPONENTS

CROSS REFERENCE TO RELATED APPLICATION

This application is a divisional of U.S. application Ser. No. 14/048,939, filed on Oct. 8, 2013, which is hereby incorporated by reference in its entirety.

FIELD OF THE INVENTION

The invention pertains to the field of construction of buildings and structures. The invention relates to alignment guides, and more specifically alignment guides for constructing building components.

BACKGROUND OF THE INVENTION

In the construction of buildings and structures many techniques and technologies have been developed for increasing accuracy, productivity, efficiency and sustainability.

These techniques and technologies range from pre-fabricated completed structures or sub-assemblies built in factories and assembled on site, to formless and formed cement products and traditional stick and frame construction.

Each of these building techniques and technologies comes with inherent restrictions and limitations in their use. Many of these limitations surround initial cost, cost for changes and transportation costs for delivery.

For example, a pre-fabricated house is built in factory, checked for completion, dissembled, transported and re-assembled on the site. Problems on the site may be extremely difficult and costly to fix. The transportation of building subassemblies often leads to cosmetic and structural damage along with the safety and congestion problems involved in moving the building down roads and freeways.

Techniques and technologies such as structural insulated panels ("SIPS") have not shown reduction in costs or significant increase in quality and require structural demolition of the SIPS to include water pipes and electrical wiring.

Insulated concrete forms ("ICF") are expensive due to the high cost of concrete and rebar, and also suffer from high transportation costs and deconstruction of the ICF to include water pipes and electrical wiring.

U.S. Pat. No. 6,308,491 describes a panel with facings of weather resistant plastic impregnated paper ("PIP") disposed on opposed outer surfaces of an inner insulating core, such as of plastic foam or an agricultural product such as strawboard. Spaced elongated linear studs are attached to either the outer or inner surface of one or both of the PIP facings and facilitate attachment of a structural facing.

German patent application No. DE19843400404 describes a panel with a frame, sheet-metal profiles and at least one strut connecting two frame sides, as well as a covering located on at least one plane defined by the frame and fastened thereto. The space defined by the frame thickness is filled, at least over part of said frame thickness, with an insulating material, which is preferably composed of a foamed plastic.

Traditional cement forming and steel stud walls have dominated commercial constructions. This is due to the significant costs of forming and cost of cement thus relegating this construction technique to, almost exclusively, commercial applications. Included in these significant costs are considerable design and engineering fees. Complicating this process is the need, primarily due to type of structure being built, that of skyscrapers or multi-floor buildings, to bring all internal wall structures in constant parts resulting in "one piece at a time" wall construction and its inherent high cost and inefficiencies and inaccuracies.

Traditional stick and frame construction, due to lower cost and higher adaptability to the job site, remains the favorite construction method for the vast majority of the construction trades. It has been universally recognized that while the traditional stick and frame construction may not have the same level of quality, durability, efficiency or accuracy as some of the later developed technology such as ICF or SIPS or factory built structures, it does have the greatest adaptability to site conditions and changes.

SUMMARY OF THE INVENTION

The invention relates to alignment guides for constructing building components, namely walls, ceilings and floors to be used in buildings and structures. This invention also relates to kits of specific alignment guides and methods of using alignment guides.

The invention relates to a plurality of alignment guides, each alignment guide comprising a series of slots spaced lengthwise, said alignment guides capable of placement along a first end and a fourth end of a construction sheet having the first end opposite the fourth end and a second end opposite a third end, such that studs placed substantially perpendicular to the alignment guides and aligned between each slot on the alignment guide on the first end and an opposing slot on the alignment guide on the fourth end form a series of equally spaced parallel studs. And further comprising at least one second alignment guide capable of placement on the second end and at least one third alignment guide capable of placement on the third end wherein a stud abutting the second alignment guide rests outside of the second end of the construction sheet and a stud abutting the third alignment guide rests inside of the third end of the construction sheet.

The invention relates to an open trough shaped alignment guide comprising a base and two side arms, said base approximating the width of a construction stud and at least one of said side arms further projecting to form an exterior side channel having a width approximating the depth of a sheet of construction material. In a further embodiment there are two side channels which open in the opposite direction of the trough or two side channels which open in the same direction as the trough.

This invention further relates to an open trough shaped alignment guide comprising a base and two side arms, the width of said base approximating the width of a construction stud and the length including slots spaced equidistance apart, said side arms further projecting firstly perpendicular and secondly parallel to the side arms to each form an exterior side channel opening in the opposite direction of the open trough, each channel having a width approximating the depth of a sheet of construction material, said side arms having a height approximating the depth of a construction stud.

This invention further relates to an open trough shaped alignment guide comprising a base and two side arms, the width of said base approximating the width of a construction stud and said side arms further projecting firstly perpendicular and secondly parallel to the side arms to each form an exterior side channel opening in the opposite direction of the open trough, each channel having a width approximating the depth of a sheet of construction material, said side arms having a height approximating half the depth of a construction stud.

This invention further relates to an open trough shaped alignment guide comprising a base and two side arms, said base approximating the width of a construction stud and said side arms approximating the height of half the depth of a construction stud, each side arm projecting first substantially perpendicular to form a shelf having a width approximating the depth of a sheet of construction material, and projecting secondly substantially parallel to the side arm.

This invention further relates to an trough shaped alignment guide comprising two detachable right-angle shaped base units each with a bottom and side and two detachable side arm units further projecting to each form an exterior side channel having a width approximating the depth of a sheet of construction material, wherein both the bottoms and the sides of the base units have multiple attachment points such that the width of the bottom is adjustable when the bottoms are attached and the height of the sides is adjustable when each side of the base unit is attached to each side arm unit.

This invention further relates to a pair of square shaped alignment guides for rotating a building component, each alignment guide comprising a flat base with a width approximating the width of a construction stud, and comprising an opening in the middle through which a holding means is attached, said base including securing means for securing each alignment guide to opposite ends of the building component.

This invention further relates to a kit of alignment guides capable of being positioned at each of the four edges of a row of at least one construction sheet, said alignment guides on two opposing edges of the row having indexing means to indicate the attachment location for studs, said alignment guides on the other two opposing edges of the construction sheet having opposing shapes such that the construction sheet on one side protrudes and on the other side intrudes.

This invention further relates to a kit comprising one or more of the alignment guides described above.

This invention further relates to a method of constructing a building component using studs and one or more construction sheets, comprising the steps of: placing the one or more construction sheets lengthwise in a row to form two outer lengthwise edges and a first and second outer side edge; placing along the two outer lengthwise edges of the row a first open trough shaped alignment guide comprising a base and two side arms, the width of said base approximating the width of a construction stud and the length including slots spaced equidistance apart, said side arms further projecting firstly perpendicular and secondly parallel to the side arms to each form an exterior side channel opening in the opposite direction of the open trough, each channel having a width approximating the depth of a sheet of construction material, said side arms having a height approximating the depth of a construction stud; placing along one of the first outer side edge a second open trough shaped alignment guide comprising a base and two side arms, the width of said base approximating the width of a construction stud and said side arms further projecting firstly perpendicular and secondly parallel to the side arms to each form an exterior side channel opening in the opposite direction of the open trough, each channel having a width approximating the depth of a sheet of construction material, said side arms having a height approximating half the depth of a construction stud; placing at either end of the second outer side edge at least two of a third open trough shaped alignment guide comprising a base and two side arms, said base approximating the width of a construction stud and said side arms approximating the height of half the depth of a construction stud, each side arm projecting first substantially perpendicular to form a shelf having a width approximating the depth of a sheet of construction material, and projecting secondly substantially parallel to the side arm; placing studs substantially perpendicular and between the first alignment guides guided by the slots to form a series of equally spaced parallel studs; and securing the series of studs to the first alignment guides.

And the method may further comprise the step of securing the alignment guides to the construction sheets and/or further comprises the step of covering the studs with construction sheets. If the studs are wood, the method further comprises the additional step of removing the alignment guides. If the studs are metal the alignment guides may remain with the building component and not be removed.

The method may further comprise the step of installing foam between the studs. The alignment guides described above may additionally include marking of information selected from the group of volume, measurement and building code.

The alignment guides may be used with construction sheet(s) selected from the group of drywall, particleboard, plywood and fiberglass. One or more of the alignment guides may be attached together. A kit of alignment guides, in which one or more of the alignment guides are attached together, are capable of being positioned around a four-sided row of at least one construction sheet, and the alignment guides are attached to at least one of the sides of the row. A kit of alignment guides capable of being positioned at each of the four edges of a row of at least one construction sheet, on one of the edges of the row have indexing means to indicate the attachment location for studs, said alignment guides on the other three edges of the construction sheet being attached to one another.

DESCRIPTION OF THE INVENTION

Figure 1:
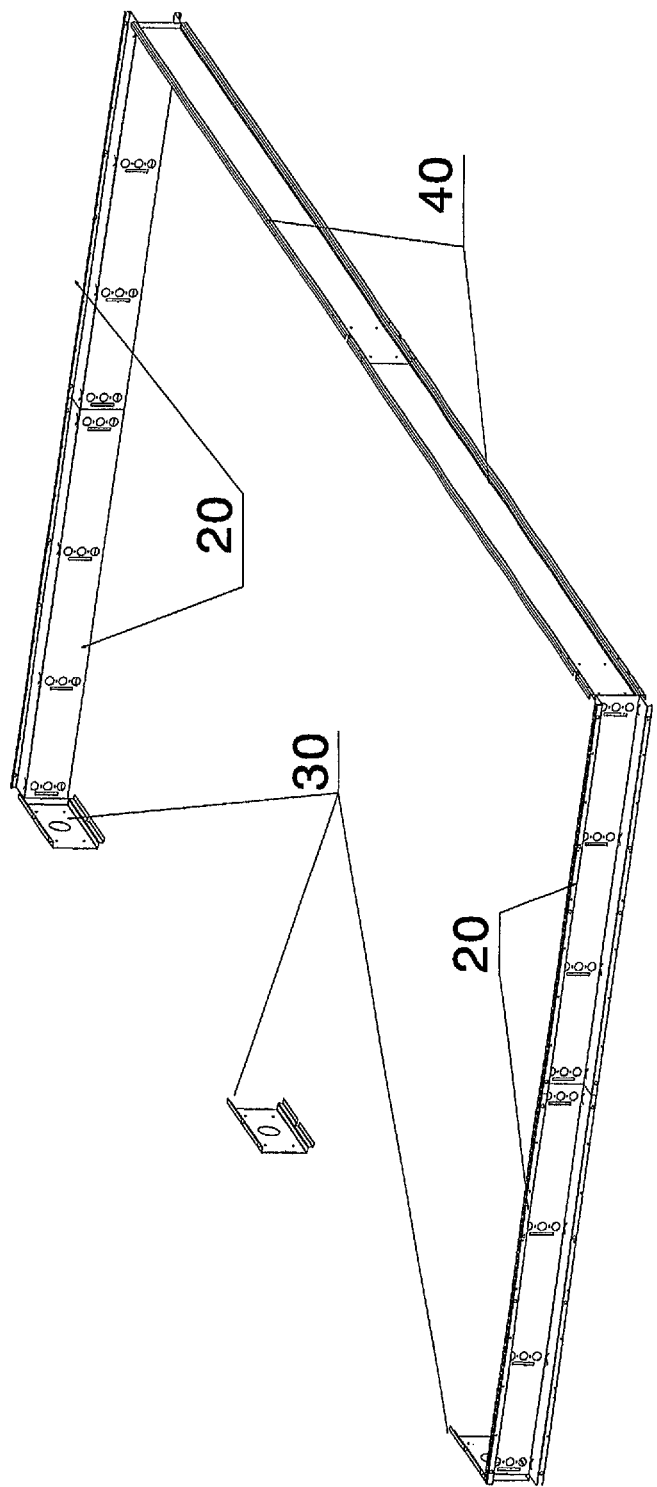
FIG. 1 is a perspective view of the alignment guides of an embodiment of the present invention without construction sheet material.

The present invention exploits the high tolerance accuracy of modern construction sheets and the adaptability of on-site construction. The present invention is adapted to current construction materials, as well as current sizing and standards in construction, such as the type and size of construction sheets and studs, and the sixteen inch spacing of studs. However, the present invention is adaptable to changes in the sizes and materials of construction material as well as the standard modes of construction.

The present invention relates to alignment guides which are placed on construction sheets on-site to guide the construction of walls, ceilings and floors with construction studs. Each alignment guide may comprise armatures for indexing to the sheet material, and a main body. Construction studs refer to the vertical posts typically of wood or steel in the framework of a wall running between a header and footer, but in this description the studs refer to the framework used for a wall, floor or ceiling. Typical types of construction sheet material or wallboard are drywall or gypsum, particleboard and plywood, but may be any material board material such as fiberglass etc. In this description, an alignment guide placed at the top or bottom of a construction sheet is referred to as the header/footer alignment guide for ease of orientation although a ceiling or floor may not have the same header/footer (or top/bottom) reference point as a wall, and even though a wall built with alignment guides of the present invention may also be capable of being orientated differently than a standard type of wall. The alignment guides which are referred to in this description as being placed on the sides of a construction sheet are again described this way to orientate alignment guides relative to one another and with regard to enabling the description of how the "sides" of the wall or floor or ceiling to fit together in a tongue and groove type fashion.

In an embodiment of the invention, there are three specific alignment, guides, namely header/footer, tongue, and groove, capable of being mechanically fastened to the head and foot and each side, respectively, of any sheet of construction material, and which together enable the construction of a wall, ceiling or floor accurately and quickly. The alignment guides of an embodiment of the invention include indexing for indicating the placement of internal and external parts that are required to make a wall, ceiling or floor, and also allow for placement of insulation and closure of the wall, ceiling or floor.

The alignment guides enable the construction of walls, floors and ceilings, including inner and outer surfaces, with the ability to easily include internal supporting structures, wiring, plumbing and insulation of whatever type. The assembly of building components can be completed quickly with the alignment guides of the present invention and without the use of measuring devices, such as a measuring tape.

An embodiment of the present invention further relates to a kit comprising various types of alignment guides. For example a kit may comprise three specific types of alignment guides, which may be used in plurality to enable the construction of a wall, floor and ceiling. The number of alignment guides of each type used will vary with the size of the wall, ceiling and floor component being constructed.

For instance a wall, ceiling or floor component measuring four by eight feet would have one header/footer alignment guide at the head, one header/footer alignment guide at the foot, one groove alignment guide on one side and one, two three tongue alignment guide(s) on the other side. The alignment guide used at the head is the same configuration as the alignment guide used at the foot given the typical header and footer of typical walls.

If the wall, ceiling or floor is twice as tall as the above example there could still be one header/footer alignment guide at the head, one header/footer alignment guide at the foot, but there would be two groove alignment guides (or one elongated guide) and three or more tongue alignment guides.

By being modular in nature, sets or kits of the alignment guides can accommodate all wall, ceiling and floor configurations.

The alignment guides include one or more holes for passage of either standard or custom fasteners to allow for anchoring and fastening of all internal parts of the wall, ceiling or floor, and each alignment guide may be designed to hold a chalk line end for ease of sheet material marking.

Each alignment guide may comprise an alignment slot allowing the use of any construction tool available to be used to place the wall, ceiling or floor's internal pieces. This is accomplished by inserting the construction tool into any of the alignment guides' alignment slot and placing the internal piece against it, thus achieving a "go/no go" guide and eliminating the use of measuring instruments.

Each alignment guide may have specialized openings to allow for the accurate passing through of water and electrical and HVAC services.

Each alignment guide may have a specialty coating to prevent the buildup of construction adhesives and or insulating foams onto the alignment guide, but in the case where the alignment guide is included in the wall, this specialty coating need not be applied.

In addition the header/footer alignment guides can be mechanically assembled to be used to make eight foot walls or whatever size is required.

These alignment guides may all have a detachable support point to allow for insertion of a pipe to be supported in such a fashion as to allow the wall to be easily turned.

An embodiment of the alignment guides relating to the present invention is shown in FIG. 1 without the accompanying covering construction sheet material in order to view the alignment guides more easily. FIG. 1 shows two header/footer alignment guides 20 at each of the head and foot of what could be a wall, floor or ceiling, with tongue alignment guides 30 on one side, and groove alignment guides 40 on the other side.

Figure 2:
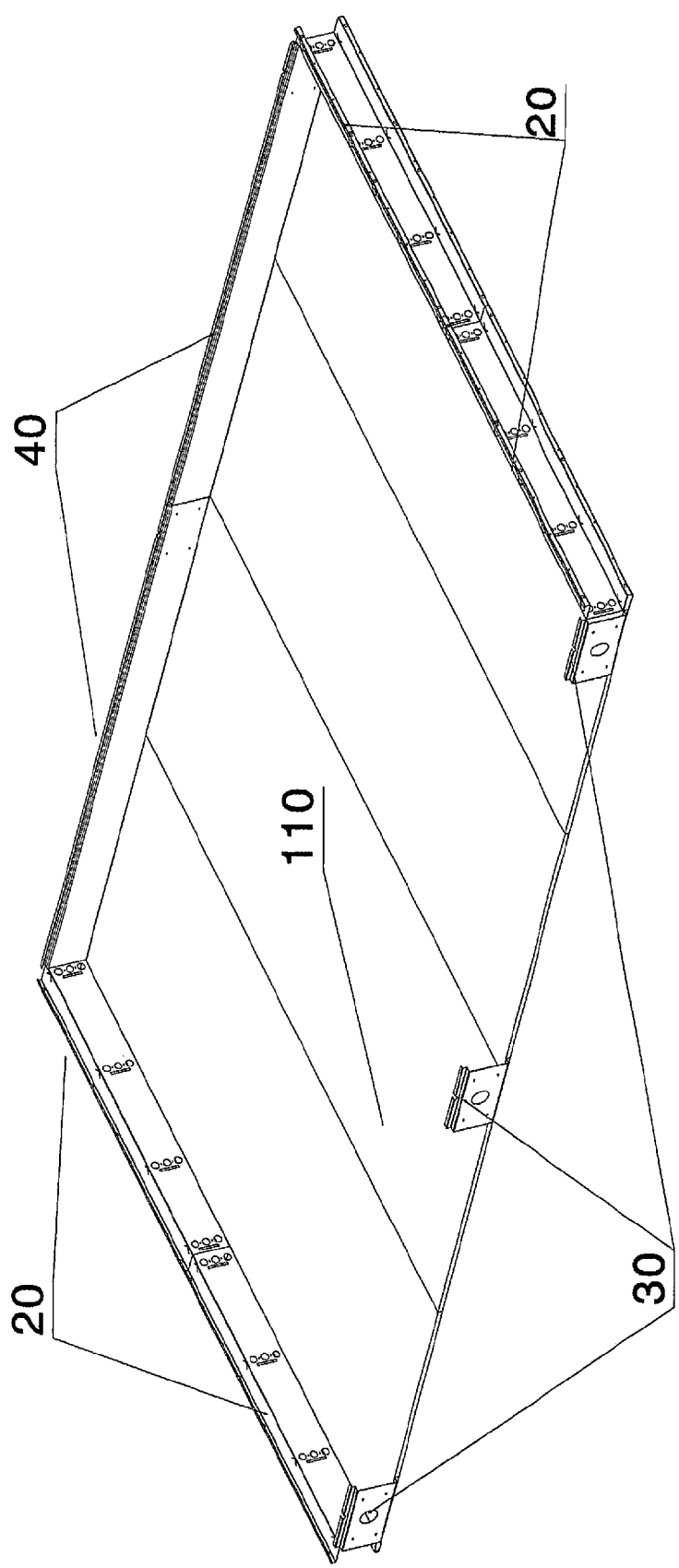
FIG. 2 is a perspective view of the alignment guides of FIG. 1 with construction sheet material.

In FIG. 2, the alignment guides of FIG. 1 are shown assembled to a construction sheets 110, creating a sixteen foot by eight foot wide wall with multiple alignment guides 20, 30, 40 being used.

Figure 3:
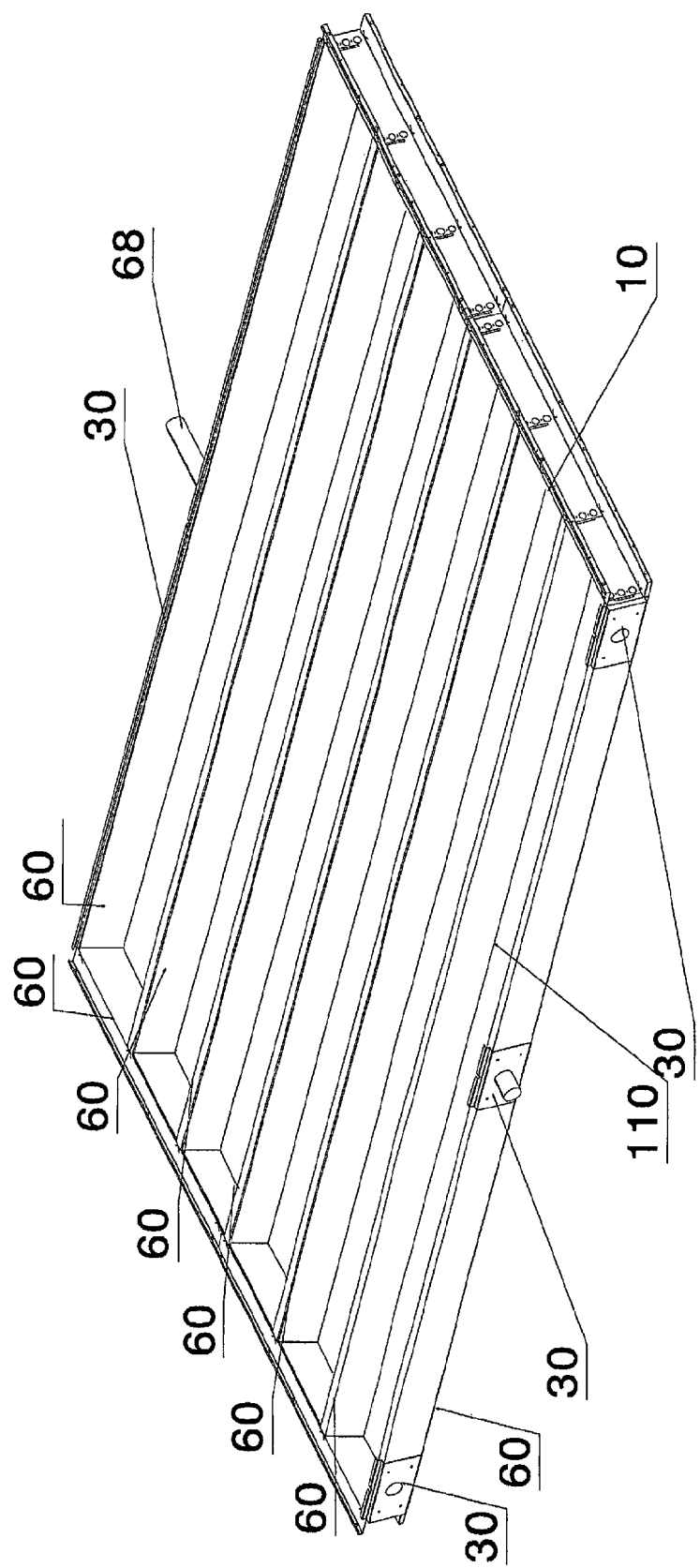
FIG. 3 is a perspective view of the alignment guides of FIG. 2 with studs.

In FIG. 3, studs 60, and construction sheet 110 are shown with the alignment guides 30 and a conduit 68 is shown for electrical service.

Figure 4:
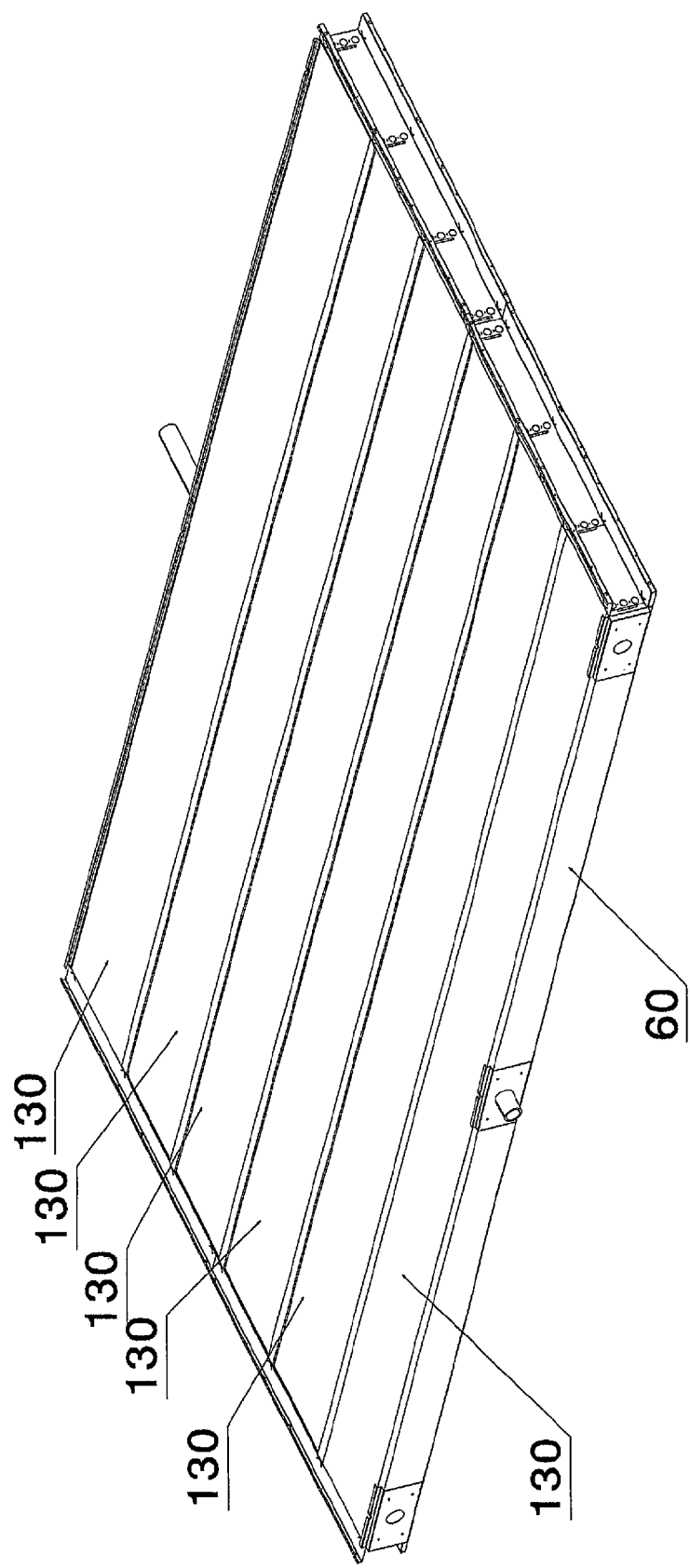
FIG. 4 is a perspective view of the alignment guides of FIG. 3 with foam insulation.

In FIG. 4, spray foam 130, (although any insulating material may be used) has been installed into the wall cavity between studs 60. Prior to placement of spray foam all other internal wall structures, such as water, HVAC and electrical services are installed where necessary.

Figure 5:
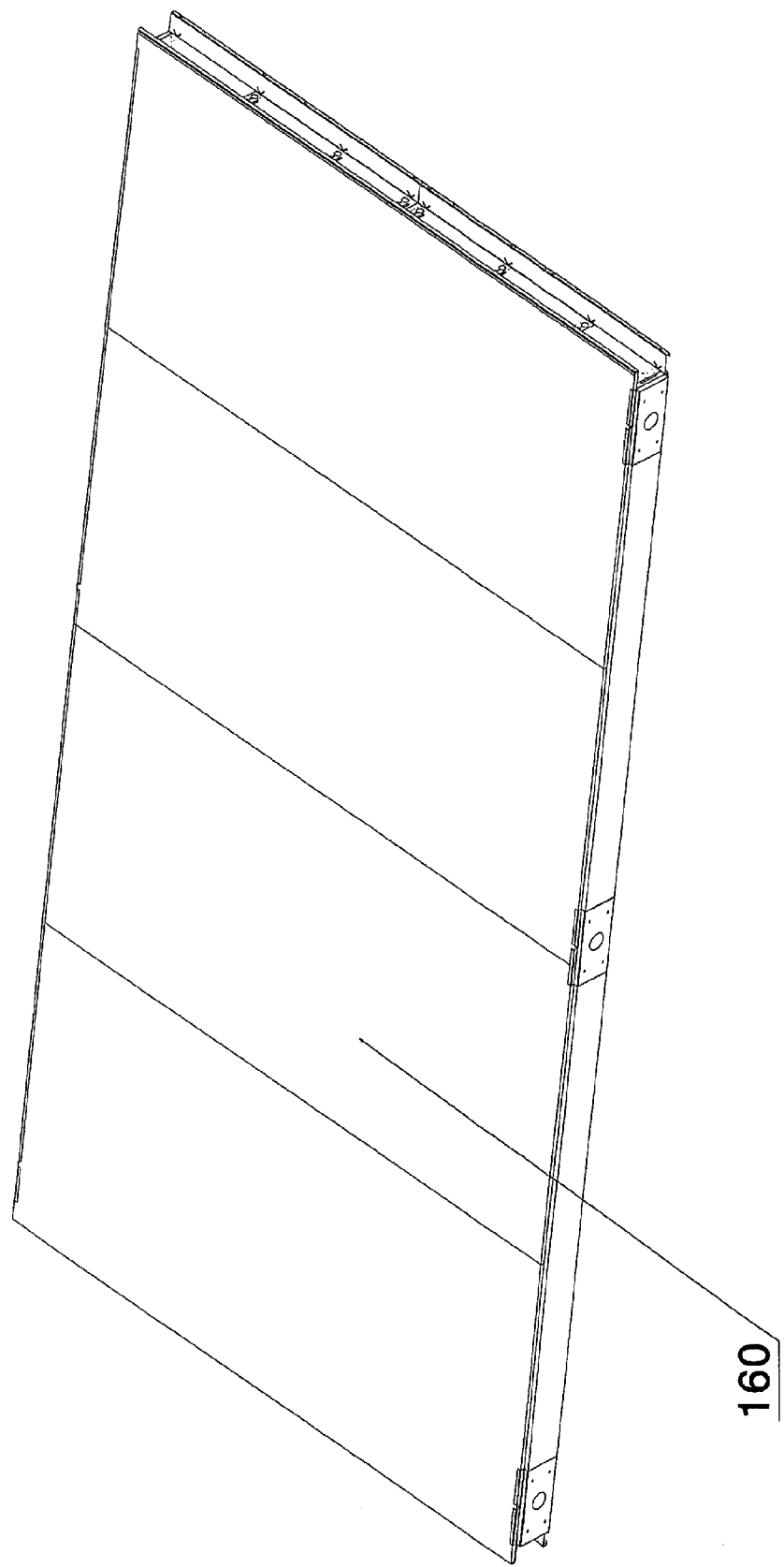
FIG. 5 is a perspective view of the alignment guides of an embodiment of the present invention in a completed wall.

In FIG. 5, an external cladding 160, has been attached to a wall structure, thus completing the wall. At this point in time the alignment guides 20, 30, 40 would be disassembled from the wall and the wall can then be placed in the building structure.

Each of the alignment guides 20, 30, 40 have different shapes to accomplish different dimensional requirements which is shown in the following figures.

Figure 6:
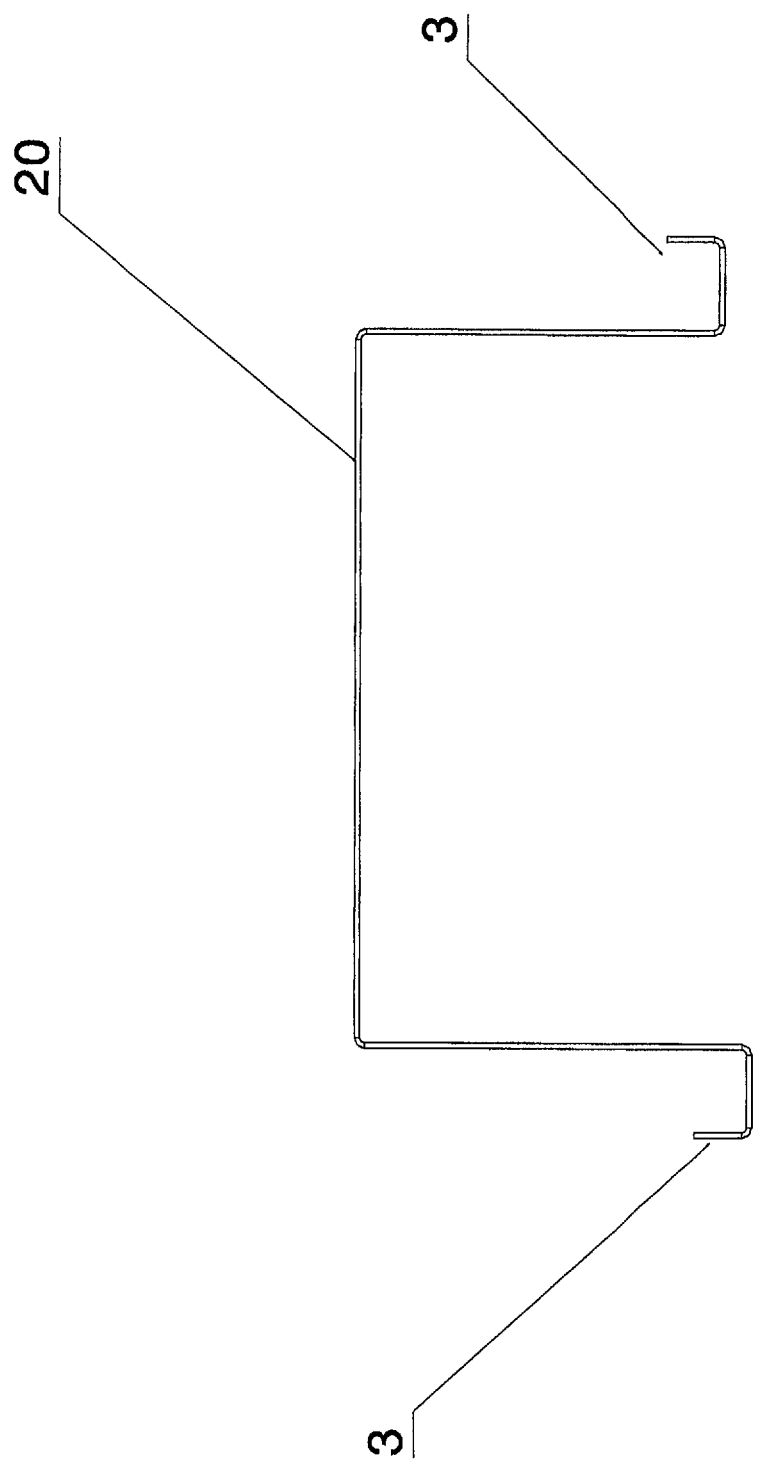
FIG. 6 is a cross-sectional view of an embodiment of a header/footer alignment guide.

For instance the header/footer alignment guide 20, has a cross section shape as shown in FIG. 6, which also shows its side channels 3.

Figure 7:
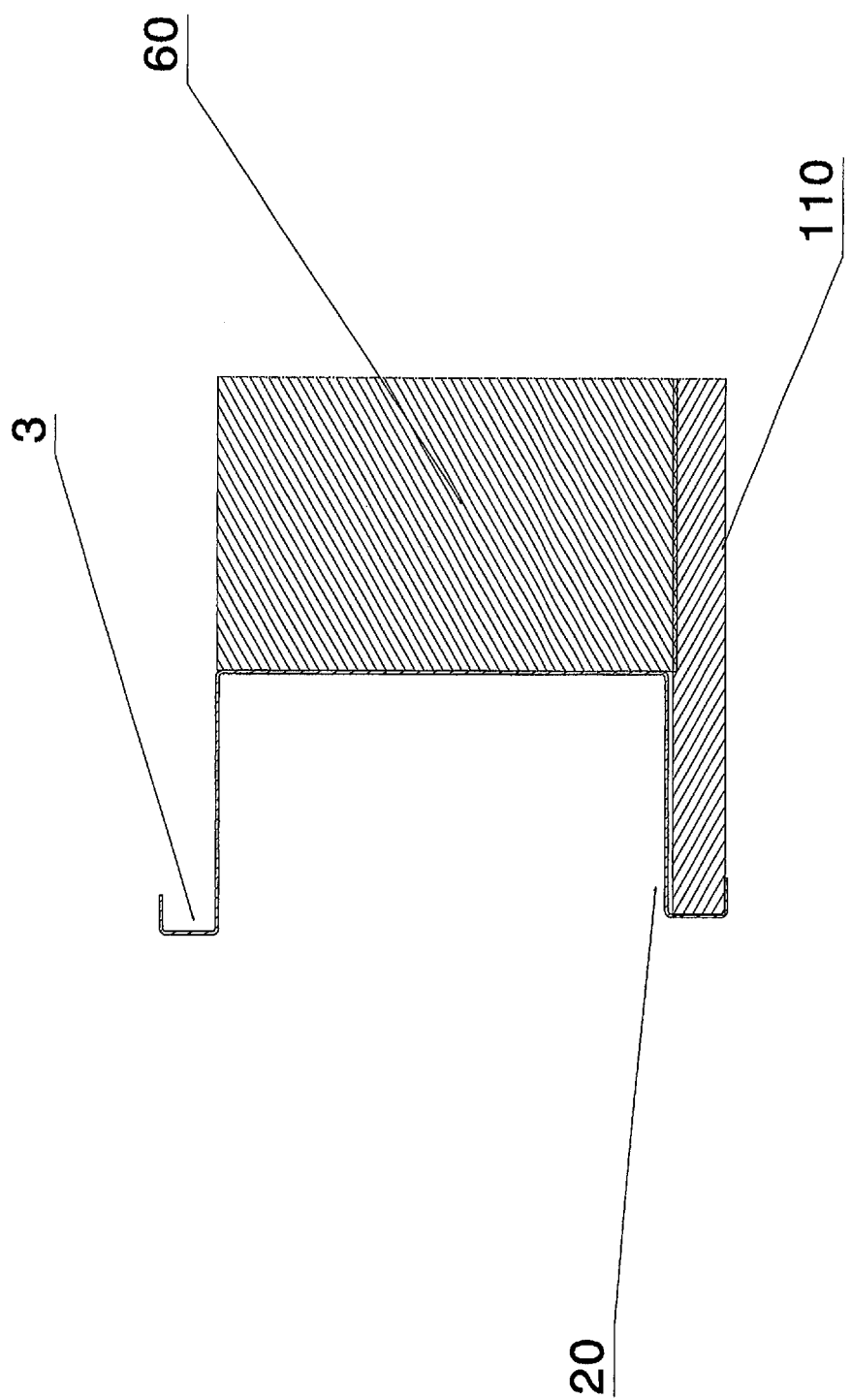
FIG. 7 is a cross-sectional view of an embodiment of a header/footer alignment guide showing placement of a stud and a construction sheet.

In FIG. 7 the cross-section of alignment guide 20 shows only one construction sheet 110 in place for ease of viewing of the invention. It also indicates the channels 3, to which the construction sheet 110 is inserted to provide the basic assembly of the alignment guides.

In an embodiment, the header/footer alignment guide 20 has dimensions of three inches and works with 2×6 construction grade spruce studs to which the wall is attached, once the wall is assembled and the alignment guide 20 is removed. The 2×6 studs are then attached to the floor as, is common practice in structure building.

Figure 8:
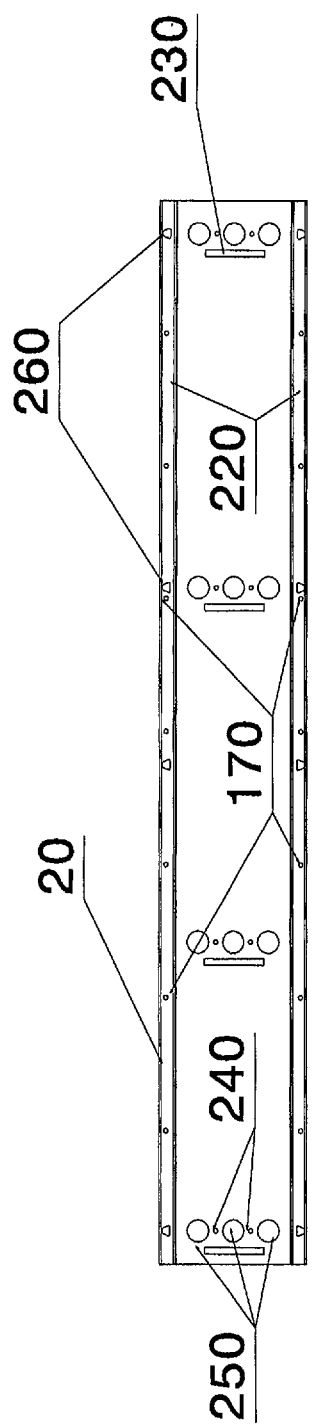
FIG. 8 is a top view of an embodiment of a header/footer alignment guide.

When the construction sheet 110 is put in place it is secured using any readily available fastener through holes 170 shown in FIG. 8. In FIG. 8, there are a number of holes 170 along the fastening edge 220 since there can be any number and any spacing of holes desired.

Also in FIG. 8, there is provided a square shape slot 230 which can be placed at equal spacings of 16 inches. These slots 230 are placed at standard building code spacing for wall studs and the slot accommodates any number of common elongate tools found on a constructions site (e.g. screw driver, carpenter's pencil etc.) which can be inserted into the slot 230 to align the stud 60 with the alignment guide 20 without use of measuring equipment, making the alignment quick and accurate.

For example, once placed in the right position the stud 60 is fastened to alignment guide 20 with any readily available fastener through securing hole 240 to secure its position. This fastener may be removed later when the alignment guides are disassembled.

In the event that headers are to be included in a wall assembly, header/footer holes 250 have been placed on the alignment guide 20 at 16 inch centers allowing fastening between the stud and the header or footer. These fasteners do not hold on to the alignment guide 20, but do hold a header and stud or footer and stud together.

It is understood that the location and size of holes may be modified to accommodate different fasteners/fastener systems and/or different building codes/standards. Typical fasteners are screws and nails, but any fastener system may be utilized to achieve the same result.

Also conveniently located on the fastening edge 220 is the chalk line holding tab 260 for ease of construction for marking the construction sheet 110 when in place for the centerlines of the studs 60 for mechanical fastening.

In an embodiment, the overall length of an alignment guide 20 is four feet, namely the width of the construction sheet 110. If the wall is to be eight feet wide there would be two alignment guides 20 used end to end.

Figure 9:
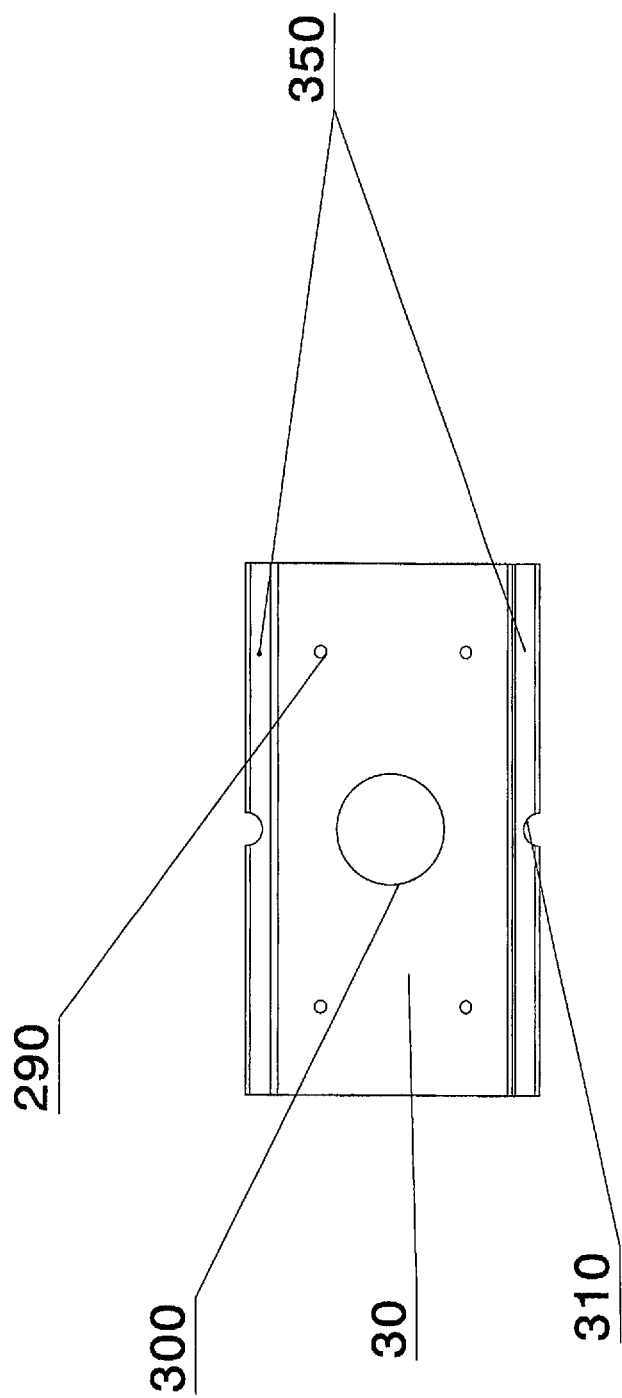
FIG. 9 is a top view of an embodiment of a tongue alignment guide.

As shown in FIG. 9, an embodiment of the tongue alignment guide 30 can be of any length, but is shown to be eight feet. In an embodiment of the invention the tongue alignment guide 30 is twelve inches and three tongue alignment guides 30 are used. The three are located in such as fashion as to facilitate aligning of the construction sheet 110.

In FIG. 9, a tongue alignment guide 30 is shown with tongue holes 290 for attaching it to the stud 60. In an embodiment of the invention the tongue alignment guide 30 includes an opening 300 for passing any pipe or conduit with water, electrical, HVAC etc. through, and a sheet alignment groove 310 for assuring that when two or more sheets are used the edge alignment of the sheets can be seen. There are also a number of fastening holes 350 for fastening the alignment guide 30 to the edge of construction sheet 110.

Figure 10:
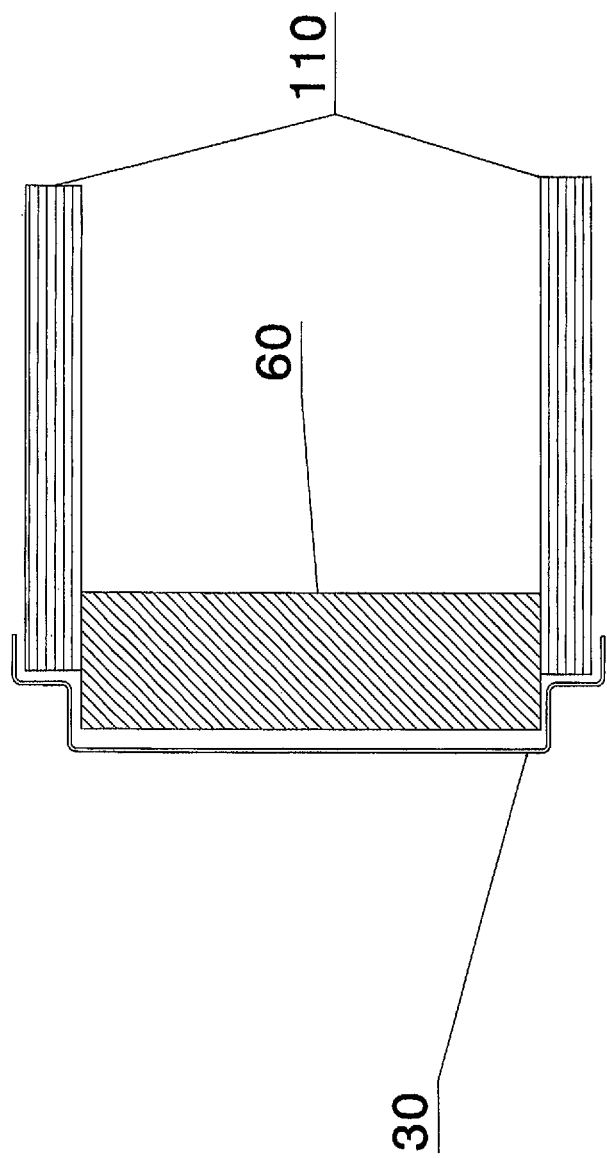
FIG. 10 is a cross-sectional view of the tongue alignment guide of FIG. 9.

In FIG. 10, a tongue alignment guide 30 is shown in cross-section, to show a stud 60 held in place such that part of the stud thickness extends beyond the edge of the construction sheet 110 so as to create a tongue for inserting into the groove of the next wall assembly. In an embodiment, about half of the stud thickness is extending beyond the edge of the construction sheet 100, which is 0.75 inches for a standard stud.

Figure 11:
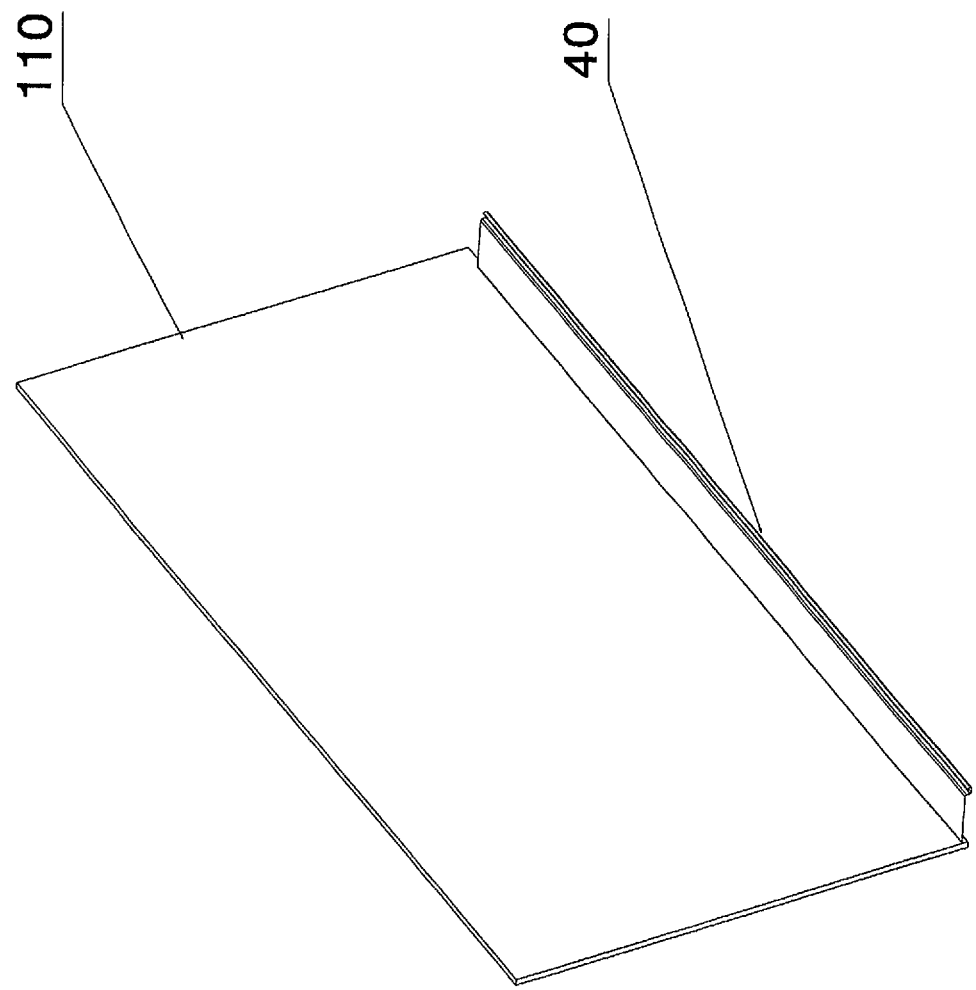
FIG. 11 is a perspective view of an embodiment of a groove alignment guide sized to the length of a construction sheet.

An embodiment of a groove alignment guide 40 is the groove side of the tongue groove assembly feature for assembling the finished walls. In an embodiment shown in FIG. 11, the groove alignment guide 40 is the length of the construction sheet 110. In another embodiment of the invention shown in FIG. 1, there are two groove alignment guides 40 abutted end to end to make the sixteen foot wall length.

A groove alignment guide 40 creates a cavity in the foam insulation and enables for the insertion of the tongue portion of the next assembled wall.

Figure 12:
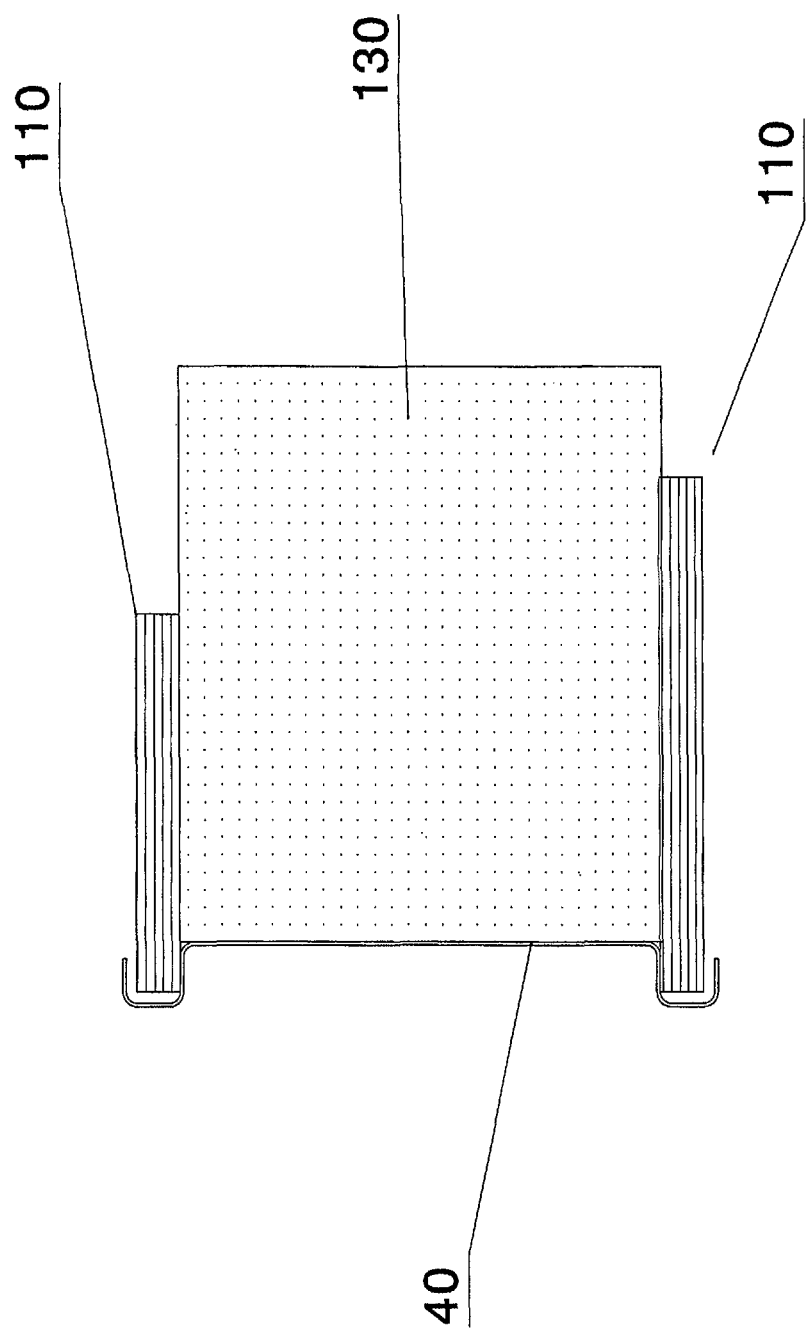
FIG. 12 is a cross-sectional view of an embodiment of a header/footer alignment guide with insulation foam.

FIG. 12 shows the cross-section of a groove alignment guide 40. In this embodiment the reciprocity to the dimensions of a tongue alignment guide 30 is achieved since a groove alignment guide 40 keeps the foam 130 back, and there is no stud required here as it is incorporated in the next unit. In FIG. 12 the spray foam 130 is shown in place up to the inner surface of a groove alignment guide 40 and thus once groove alignment guide 40 is removed the groove is created.

In an embodiment, a groove alignment guide 40 is coated with release paint or agent to prevent the spray foam 130 from sticking to it. In an embodiment, alignment guides may be used in this manner to construct foam insulation blocks to be installed in other walls, floors or ceilings.

In an embodiment, the alignment guides may be removed and reusable and this is typically desirable from a cost perspective as well as for ease of use with wood studs. However, the alignment guides (or selected alignment guides) may also remain on the building component if desired.

In an embodiment, when steel stud construction is preferred, the alignment guides may remain with the wall, floor or ceiling constructed. Allowing alignment guides to become integral to the structure of a wall, floor or ceiling may aid in the consolidation of internal parts and external parts, increase in accuracy and efficiency and decrease costs.

In another embodiment, a header/footer alignment guide 20 can replace a groove alignment guide 40 by not fastening the stud in place and by coating that stud with plastic or tape to prevent bonding with foam and so once assembly is completed the stud could then be removed leaving the foam cavity. This cavity is of the same dimension as created by a groove alignment guide 40. This makes the kit simpler in that only a header/footer alignment guide 20 and a tongue alignment guide 30 are required which results in less expense and smaller storage of alignment guides. It will be understood that even one of the multiple types of alignment guides or two or three and any variety therein may be used. As well, a kit comprised of any number of the three types of alignment guides is also contemplated, the three types being the header/footer alignment guide, tongue alignment guide and groove alignment guide. As well as kits with these alignment guides in sizes all designed for 2×4 studs or 2×6 studs or 2×8 studs etc. Or a kit with fixed and adjustable alignment guides or just adjustable alignment guides. And to any of these kits can be added rotatable alignment guides.

When using the various types of alignment guides together the tongue alignment guides may be used at either end of a construction sheet or a row of construction sheets, to align the edges of the construction sheet or sheets, and if there is a row of construction sheets a further tongue alignment guide may be placed in the center or for longer rows at equal spacing. And likewise the groove alignment guide may be used to align the edge of a construction sheet. With one construction sheet, two tongue alignment guides could be used to align the edges of one side of a construction sheet and one header/footer alignment guide could be used at both the head and foot of the construction sheet and a single groove alignment guide used on the other side of the construction sheet. With rows of construction sheets, additional alignment guides may be used or different sized guides may be used that are adapted and fixed or adjustable.

Alignment guides that have a trough shape and channels on either side are capable of being used to build either a stud frame with no construction sheets attached but a construction sheet may be used for alignment purposes, or a single construction sheet wall or a double construction sheet wall and also with foam or without. Fixed or adjustable alignment guides may also be made with only a channel on one side for single construction sheet walls or stud frame with no construction sheet. References to wall will be understood to include the same construction for a ceiling or floor.

In an embodiment one or more of the alignment guides are attached together, through mechanical fastening or welding, rather than being separate components. The attached alignment guides only need one of the guides to be indexed to only one edge of the construction sheet (or the guides on one edge to be indexed if there is more than one guide on that edge). It is understood that one can use one or two or three edges of the construction sheet for alignment with the alignment guides attached together. In an embodiment the alignment guides are mechanically attached together and are not attached to a construction sheet to form a frame from which to build a wall, floor or ceiling.

It is well known and understood in the construction industry that walls are made not only in different sizes and shapes but also in different thickness. Due to the adaptability of the alignment guides, they can be manufactured in multiple size configurations to accommodate different thickness in walls and for single, double or triple header configurations. The header/footer alignment guides can be printed, stamped or molded with markings such as volume, measurement or building code information that in the case of a mold can also transfer onto the insulation if the guide is in contact with the insulation, particularly foam insulation. Various wall, floor or ceilings may be created using the present invention, such as fiberglass walls or walls of other molding type material as the construction sheet material.

Figure 13:
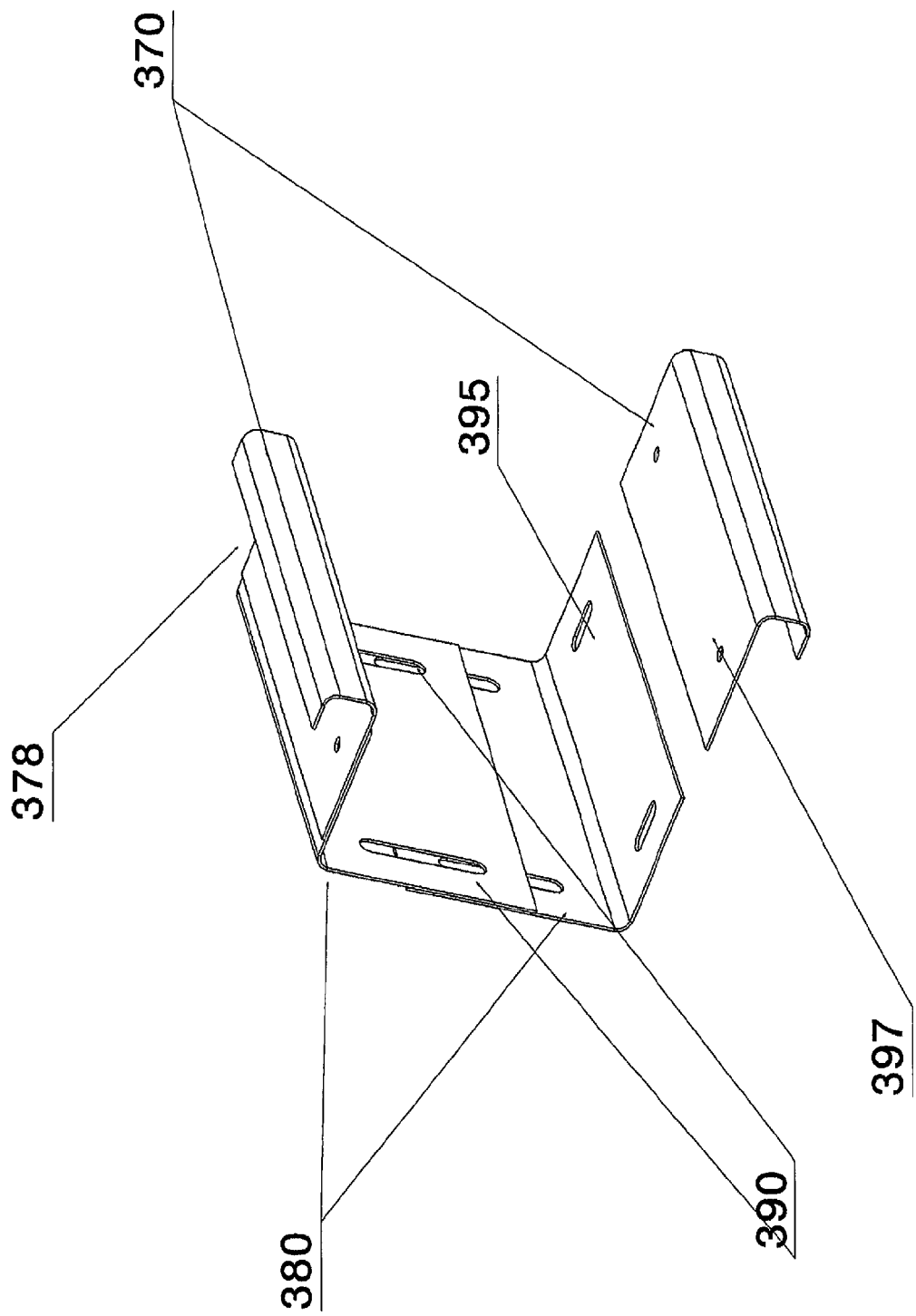
FIG. 13 is an exploded view of an embodiment of an adjustable alignment guide.

In an embodiment there is an adaptable alignment guide embodying the components of the alignment guides 20, 30 and 40 with basic adjustments to accommodate the different thickness of the wall, floor or ceiling. An embodiment of the adaptable alignment guide 378 is shown in FIG. 13 in which there are two detachable right-angle shaped base units 380 (each with a bottom and side) which attach together through fasteners on side slots 390 and two side arm units 370 which attach to the bases 380 through fasteners to bottom slots 390 and which base unit attaches a side arm unit through slots 395 and side holes 397. Bottom slots 390 and side slots 395 allow for movement relative to each part to adjust for different thickness of wall construction. Such fasteners could be bolts. The adaptable alignment guide 378 allows for a single alignment guide to accommodate multi-sized wall and construction sheet 110 thicknesses. Given that either multiple alignment guides or different alignment guides of selected fixed sizes or alignment guides of adjustable size may be used, the corresponding wall, ceiling or floor may also be of varying sizes.

Figure 14:
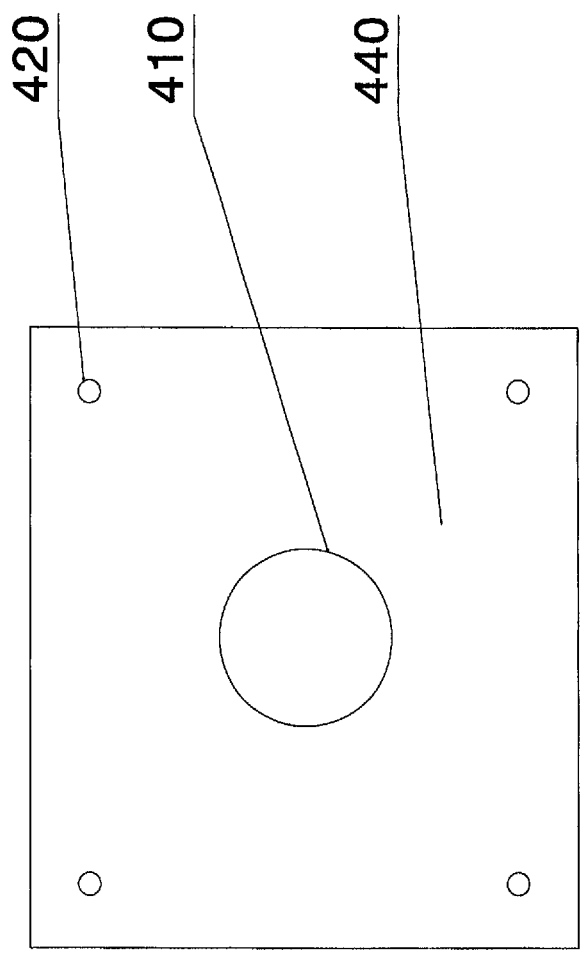
FIG. 14 is a plan view of an embodiment of a rotatable alignment guide.

In an embodiment, a wall, floor or ceiling could be rotatable for ease of assembly, pouring insulation or simply accessing the other side of the wall, floor or ceiling. An embodiment of a rotatable alignment guide 440, shown in FIG. 14, in its simplest depiction has corner holes 420 for fasteners to attach it at about the center line of the head or foot of the wall, floor or ceiling either to the construction sheet(s) and/or to the header/footer alignment guide. Support for this rotatable alignment guide could be any convenient structure on the construction site or could be custom fabricated for the purpose therein. Once attached, any holding means, such as a construction pipe, is inserted into the insertion opening 410 to act as the rotational point. One rotatable alignment guide is secured at the footer and another rotatable alignment guide is secured at the header, each with a holding means such as a pipe or pole, to form an axis of rotation.

The alignment guides allow for any length of height of wall, floor or ceiling to be constructed on the ground horizontally and lifted into place, and mechanical equipment may be used for lifting due to heavy weight. Errors may be easier to see and correct when a wall or other building component is lying down. The alignment guides eliminate the use of chalk lines and expensive lasers resulting in less acquisition and usage of equipment, and reducing the set up time therein.

Running of services may be also much quicker and easier when a wall or other building component is in the horizontal plane.

From the above detailed description of the invention, the operation and construction of same should be apparent. While there are herein shown and described example embodiments of the invention, it is nevertheless understood that various changes may be made with respect thereto without departing from the principle and scope of the invention as measured by the following claims.

The invention claimed is:

1. A method of constructing a building component using studs and one or more construction sheets, comprising the steps of: placing the one or more construction sheets lengthwise in a row to form two outer lengthwise edges and a first and second outer side edge; placing along the two outer lengthwise edges of the row a first open trough shaped alignment guide comprising a base and two side arms, the width of said base approximating the width of a construction stud and the length including slots spaced equidistance apart, said side arms further projecting firstly perpendicular and secondly parallel to the side arms to each form an exterior side channel opening in the opposite direction of the open trough, each channel having a width approximating the depth of a sheet of construction material, said side arms having a height approximating the depth of a construction stud; placing along one of the first outer side edge a second open trough shaped alignment guide comprising a base and two side arms, the width of said base approximating the width of a construction stud and said side arms further projecting firstly perpendicular and secondly parallel to the side arms to each form an exterior side channel opening in the opposite direction of the open trough, each channel having a width approximating the depth of a sheet of construction material, said side arms having a height approximating half the depth of a construction stud; placing at either end of the second outer side edge at least two of a third open trough shaped alignment guide comprising a base and two side arms, said base approximating the width of a construction stud and said side arms approximating the height of half the depth of a construction stud, each side arm projecting first substantially perpendicular to form a shelf having a width approximating the depth of a sheet of construction material, and projecting secondly substantially parallel to the side arm; placing studs substantially perpendicular and between the first alignment guides guided by the slots to form a series of equally spaced parallel studs; and securing the series of studs to the first alignment guides.

2. The method of claim 1 which further comprises the step of securing the alignment guides to the construction sheets.

\* \* \* \* \*